(12) United States Patent
Kim

(10) Patent No.: US 12,743,109 B2
(45) Date of Patent: Sep. 22, 2026

(54) METHOD FOR DRIVING IN A GROUP AND SYSTEM THEREOF

(71) Applicant: HYUNDAI AUTOEVER CORP., Seoul (KR)

(72) Inventor: Jong Gon Kim, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 129 days.

(21) Appl. No.: 18/536,974

(22) Filed: Dec. 12, 2023

(65) Prior Publication Data

US 2024/0201709 A1 Jun. 20, 2024

(30) Foreign Application Priority Data

Dec. 15, 2022 (KR) ........................ 10-2022-0175711

(51) Int. Cl.
*B60W 50/14* (2020.01)
*G01C 21/28* (2006.01)
(Continued)

(52) U.S. Cl.
CPC ........... *G05D 1/6985* (2024.01); *B60W 50/14* (2013.01); *G05D 1/228* (2024.01); *G08G 1/22* (2013.01);
(Continued)

(58) Field of Classification Search
CPC ..... B60W 2050/146; B60W 2540/215; B60W 2556/50; B60W 2556/65; B60W 50/14;
(Continued)

(56) References Cited

U.S. PATENT DOCUMENTS 10,854,088 B2 12/2020 Kim
11,788,853 B2 10/2023 Kim
(Continued)

FOREIGN PATENT DOCUMENTS

KR 20090055680 A * 6/2009 ......... G01C 21/3446
KR 20140005699 A * 1/2014 ............... G08G 1/22
(Continued)

OTHER PUBLICATIONS

Office Action cited in corresponding Korean patent application No. KR 10-2022-0175711; Feb. 25, 2025; 14 pp.

*Primary Examiner* — Hossam M Abd El Latif
(74) *Attorney, Agent, or Firm* — Lempia Summerfield Katz LLC

(57) ABSTRACT

A method performed by a computing system for driving in a group includes determining a plurality of mobility devices included in a first group for group driving. The method also includes identifying a leading device among the plurality of mobility devices included in the first group. The method additionally includes transmitting first route information set in a navigation of the leading device to a trailing device included in the first group together with the leading device. The method further includes setting a first route based on the first route information in a navigation of the trailing device. The method further still includes transmitting second route information set in the navigation of the leading device to the trailing device in response to the leading device deviating from the first route. The method additionally includes setting a second route based on the second route information in the navigation of the trailing device.

15 Claims, 10 Drawing Sheets

(51) Int. Cl.

| | |
|---|---|
| ***G01C 21/34*** | (2006.01) |
| ***G05D 1/228*** | (2024.01) |
| ***G05D 1/43*** | (2024.01) |
| ***G05D 1/692*** | (2024.01) |
| ***G05D 1/698*** | (2024.01) |
| ***G05D 105/70*** | (2024.01) |
| ***G05D 109/10*** | (2024.01) |
| ***G08G 1/00*** | (2006.01) |

(52) U.S. Cl.

CPC . *B60W 2050/146* (2013.01); *B60W 2540/215* (2020.02); *G05D 2105/70* (2024.01); *G05D 2109/10* (2024.01)

(58) Field of Classification Search

CPC ....................... G01C 21/3415; G01C 21/3438; G01C 21/28; G05D 1/6985; G05D 1/228; G05D 2105/70; G05D 2109/10; G08G 1/22

USPC ............................................................ 701/23

See application file for complete search history.

(56) References Cited

U.S. PATENT DOCUMENTS

| | | | | |
|---|---|---|---|---|
| 2009/0005018 | A1* | 1/2009 | Forstall | H04M 3/42348 455/414.1 |
| 2010/0211304 | A1* | 8/2010 | Hwang | G01C 21/3484 701/532 |
| 2010/0324817 | A1* | 12/2010 | Hansen | G01C 21/3632 701/414 |
| 2018/0143026 | A1* | 5/2018 | Greenberg | G06Q 50/14 |
| 2019/0096265 | A1* | 3/2019 | Mok | G08G 1/22 |
| 2019/0259286 | A1* | 8/2019 | Kim | G08G 1/22 |
| 2020/0073408 | A1* | 3/2020 | Kim | G08G 1/22 |
| 2020/0300649 | A1 | 9/2020 | Kim | |
| 2020/0317223 | A1* | 10/2020 | Kovacek | G06Q 20/085 |

FOREIGN PATENT DOCUMENTS

| | | | |
|---|---|---|---|
| KR | 20190105150 | A | 9/2019 |
| KR | 20200111978 | A | 10/2020 |

* cited by examiner

METHOD FOR DRIVING IN A GROUP AND SYSTEM THEREOF

CROSS REFERENCE TO RELATED APPLICATION

This application claims the benefit of and priority to Korean Patent Application No. 10-2022-0175711, filed on Dec. 15, 2022, the entire contents of which are incorporated herein by reference.

TECHNICAL FIELD

This disclosure relates generally to a group driving method and a system to which the method is applied.

BACKGROUND

When a plurality of mobility devices (e.g., vehicles or other moving objects) should move to the same destination simultaneously according to the needs of users, users driving each of the plurality of mobility devices should be able to recognize each other's locations and routes.

However, in the case of the conventional group driving method, a function is provided to display only the real-time location of each of a plurality of mobility devices, so there is a problem in that it is difficult to set the same route to the same destination.

In addition, even if the same route is set for each of the plurality of mobility devices, the real-time movement route of each of the plurality of mobility devices is not known during group driving. Thus, in the case of deviation of some of the plurality of mobility devices performing group driving, there is also a problem in that it was difficult to induce the mobility device that deviated from the route to join the original route.

SUMMARY

Embodiments of the present disclosure provide a function to guide each of a plurality of mobility devices that perform group driving to the same route, and to transmit the route along which each of the plurality of mobility devices moves in real time to each of the plurality of mobility devices, so that drivers of each of the plurality of mobility devices that perform group driving are guided to the same route while driving to the destination.

Embodiments of the present disclosure provide a method of grouping a plurality of mobility devices into group driving performance targets based on a user input and unifying the navigation route information of the plurality of mobility devices included in the driving group.

Embodiments of the present disclosure provide a method of determining a leading device among a plurality of mobility devices included in a driving group.

Embodiments of the present disclosure provide a method of transmitting route information of a leading device to the navigation system of the trailing devices according to the route deviation of the leading device among a plurality of mobility devices performing group driving.

Embodiments of the present disclosure provide a method of providing, to a trailing device, an alternative route that may lead the trailing device to join a route of a leading device when the trailing device has deviated from the route according to a route deviation of the trailing device among a plurality of mobility devices performing group driving.

The technical objects of the present disclosure are not limited to the technical objects mentioned above. Other technical objects not mentioned should be clearly understood by those having ordinary skill in the art from the description below.

According to an embodiment of the present disclosure, a method performed by a computing system for driving in a group is provided. The method includes determining a plurality of mobility devices included in a first group for group driving. The method also includes identifying a leading device among the plurality of mobility devices included in the first group. The method additionally includes transmitting first route information set in a navigation system of the leading device to a trailing device included in the first group together with the leading device. The method further includes setting a first route based on the first route information in a navigation system of the trailing device. The method additionally includes transmitting second route information set in the navigation system of the leading device to the trailing device in response to the leading device deviating from the first route. The method additionally includes setting a second route based on the second route information in the navigation system of the trailing device.

In some embodiments, determining the plurality of mobility devices included in the first group for group driving comprises determining the plurality of mobility devices included in the first group based on a user input.

In some embodiments, determining the plurality of mobility devices included in the first group for group driving comprises including, in the first group, a plurality of mobility devices that have driven a same route greater than or equal to a reference distance while a same destination is set in navigation systems of the plurality of mobility devices.

In some embodiments, identifying the leading device comprises determining a leading device among a plurality of mobility devices included in the first group based on a user input.

In some embodiments, identifying the leading device comprises determining a first mobility device located at a closest distance to a first destination set in navigation systems of the plurality of mobility devices included in the first group as a leading device of the first group.

In some embodiments, setting the second route in the navigation system of the trailing device comprises displaying information related to the first route and the second route on a screen of the navigation system of the trailing device according to a determination that a difference between a branch point of the first route and the second route and a current location of the trailing device is less than or equal to a reference value, and setting the second route in the navigation system of the trailing device according to a determination that the trailing device has driven a route corresponding to the second route greater than or equal to a reference value.

In some embodiments, setting the second route in the navigation system of the trailing device comprises displaying information related to the first route and the second route on a screen of the navigation system of the trailing device according to a determination that a difference between a branch point of the first route and the second route and a current location of the trailing device is less than or equal to a reference value, and setting the second route in the navigation system of the trailing device according to a second route selection input by a driver of the trailing device.

In some embodiments, the method further comprises setting a third route for re-entering the first route set in the navigation system of the leading device in the navigation system of the trailing device according to a deviation from the first route by the trailing device.

According to another embodiments of the present disclosure, a system for driving in a group is provided. The system comprises one or more processors, and a memory for storing one or more instructions that, when executed by the one or more processors, cause the one or more processors to perform operations. The operations include determining a plurality of mobility devices included in a first group for group driving. The operations also include identifying a leading device among the plurality of mobility devices included in the first group. The operations additionally include transmitting first route information set in a navigation system of the leading device to a trailing device included in the first group together with the leading device. The operations further include setting a first route based on the first route information in a navigation system of the trailing device. The operations further still include transmitting second route information set in the navigation system of the leading device to the trailing device in response to the leading device deviating from the first route. The operations additionally include setting a second route based on the second route information in the navigation system of the trailing device.

In some embodiments, determining the plurality of mobility devices included in the first group for group driving comprises determining the plurality of mobility devices included in the first group based on a user input.

In some embodiments, determining the plurality of mobility devices included in the first group for group driving comprises including, in the first group, a plurality of mobility devices that have driven a same route greater than or equal to a reference distance while a same destination is set in navigation systems of the plurality of mobility devices.

In some embodiments, identifying the leading device comprises determining a leading device among a plurality of mobility devices included in the first group based on a user input.

In some embodiments, identifying the leading device comprises determining a first mobility device located at a closest distance to a first destination set in navigation systems of the plurality of mobility devices included in the first group as the leading device of the first group.

In some embodiments, setting the second route in the navigation system of the trailing device comprises displaying information related to the first route and the second route on a screen of the navigation system of the trailing device according to a determination that a difference between a branch point of the first route and the second route and a current location of the trailing device is less than or equal to a reference value, and setting the second route in the navigation system of the trailing device according to a determination that the trailing device has driven a route corresponding to the second route greater than or equal to a reference value.

In some embodiments, setting the second route in the navigation system of the trailing device comprises displaying information related to the first route and the second route on a screen of the navigation system of the trailing device according to a determination that a difference between a branch point of the first route and the second route and a current location of the trailing device is less than or equal to a reference value, and setting the second route in the navigation system of the trailing device according to a second route selection input by a driver in a navigation system of the trailing device.

In some embodiments, the operations further comprise setting a third route for re-entering the first route set in the navigation system of the leading device in the navigation system of the trailing device according to deviation of the first route of the trailing device.

According to another embodiments of the present disclosure, a non-transitory computer-readable storage medium, on which a group driving program is recorded, is provided. The group driving program, when executed by the one or more processors, cause the one or more processors to performs operations. The operations include determining a plurality of mobility devices included in a first group for group driving. The operations also include identifying a leading device among the plurality of mobility devices included in the first group. The operations additionally include transmitting first route information set in a navigation system of the leading device to a trailing device included in the first group together with the leading device. The operations further include setting a first route based on the first route information in a navigation system of the trailing device. The operations further still include transmitting second route information set in the navigation system of the leading device to the trailing device in response to the leading device deviating from the first route. The operations additionally include setting the second route in the navigation system of the trailing device.

BRIEF DESCRIPTION OF THE DRAWINGS

These and/or other aspects should become more readily appreciated from the following description of the embodiments, taken in conjunction with the accompanying drawings, in which.

DETAILED DESCRIPTION

Figure 1:
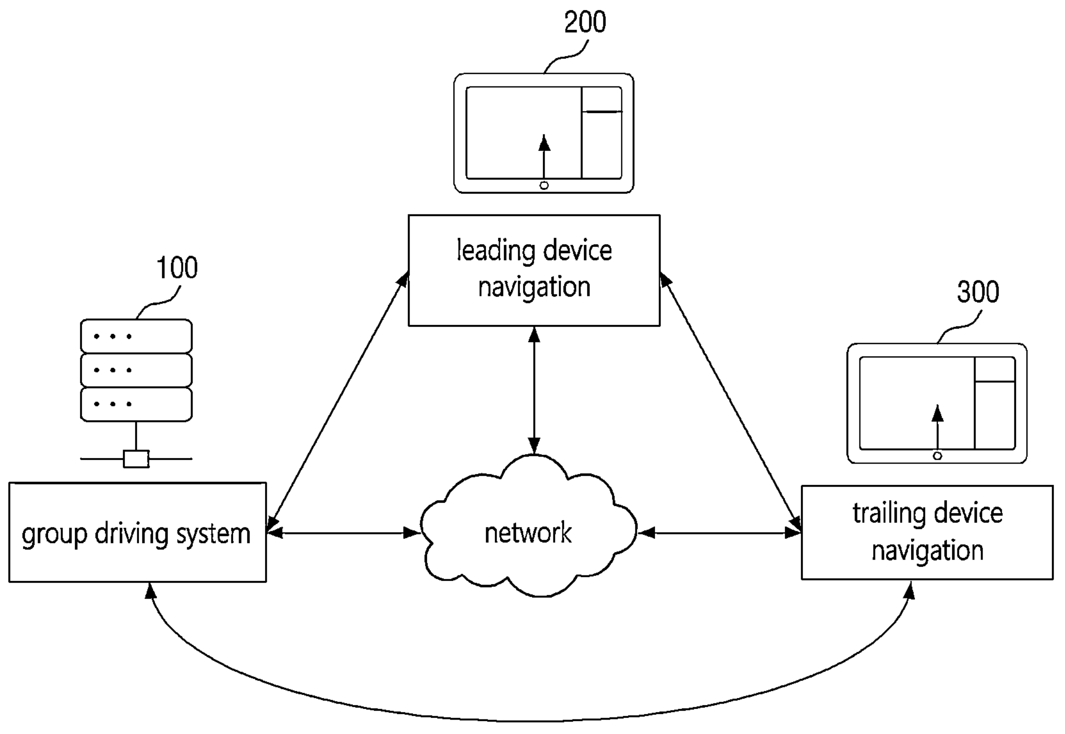
FIG. 1 shows an example environment in which a group driving system according to an embodiment of the present disclosure may be utilized.
Figure 2:
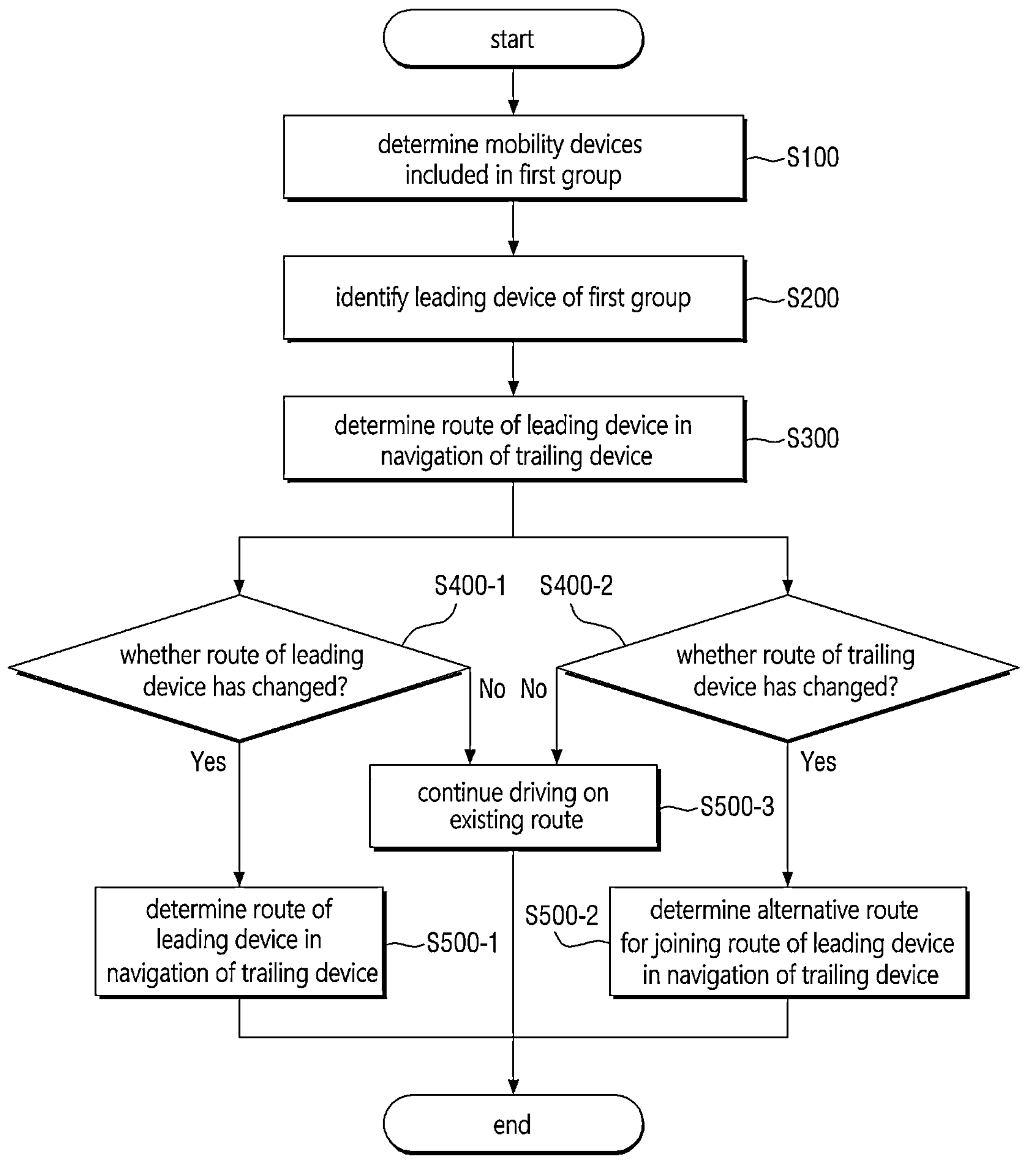
FIG. 2 is a flowchart of a group driving method, according to an embodiment of the present disclosure.

Hereinafter, embodiments of the present disclosure are described with reference to the accompanying drawings.

Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided to make the present disclosure thorough and complete and to fully convey the concept of the present disclosure to those having ordinary skill in the art. The scope of the present disclosure is defined by the appended claims.

In adding reference numerals to the components of each drawing, it should be noted that the same reference numerals are assigned to the same components even when the components are shown in different drawings. In addition, in describing the present disclosure, when it was determined that the detailed description of the related well-known configuration or function may obscure the gist of the present disclosure, the detailed description thereof has been omitted.

Unless otherwise defined, all terms used in the present specification (including technical and scientific terms) may be used in a sense that can be commonly understood by those having ordinary skill in the art. In addition, the terms defined in the commonly used dictionaries should not be ideally or excessively interpreted unless they are clearly defined in the present disclosure. The terminology used herein is for the purpose of describing particular embodiments only and is not intended to be limiting of the present disclosure. In this specification, the singular also includes the plural unless specifically stated otherwise in the phrase.

In addition, in describing the component of the present disclosure, terms, such as first, second, A, B, (a), (b), can be used. These terms are only for distinguishing the components from other components. The nature or order of the components is not limited by the terms. If a component is described as being "connected," "coupled" or "contacted" to another component, that component may be directly connected to or contacted with that other component, but it should be understood that another component also may be "connected," "coupled" or "contacted" between the components.

The terms "comprise", "include", "have", etc., when used in this specification, specify the presence of stated features, integers, steps, operations, elements, components, and/or combinations of them but do not preclude the presence or addition of one or more other features, integers, steps, operations, elements, components, and/or combinations thereof.

When a component, device, element, or the like of the present disclosure is described as having a purpose or performing an operation, function, or the like, the component, device, or element should be considered herein as being "configured to" meet that purpose or to perform that operation or function.

As used herein, "mobility device" may refer to any type of vehicle or other moving object to which the technical ideas of the present disclosure may be applied.

FIG. 1 is a diagram illustrating an example environment in which a group driving system according to an embodiment of the present disclosure may be utilized. As shown in FIG. 1, a group driving system 100 may interact with a leading device navigation system 200 and a trailing device navigation system 300 to implement a group driving method, according to an embodiment of the present disclosure.

Although the group driving system 100 and trailing device navigation system 300 are shown as separate systems in FIG. 1, in some embodiments, the group driving system 100 and trailing device navigation system 300 may also be configured in a stand-alone manner in a single system. In this case, operations performed in the group driving system 100 may be understood as being performed in the trailing device navigation system 300.

Hereinafter, with reference to FIG. 1, each component shown in FIG. 1 and the operations that each component can perform are described in detail.

The trailing device navigation system 300 according to an embodiment of the present disclosure may receive user input for a plurality of mobility devices displayed on the screen of a mobility device that includes the trailing device navigation system 300. The trailing device navigation system 300 may transmit the user input to the group driving system 100. The group driving system 100 may group the mobility device that includes the trailing device navigation system 300 and the specific mobility device(s) input by the user into the same driving group.

The trailing device navigation system 300 according to another embodiment of the present disclosure may transmit, to the group driving system 100, the user's selection input for any one of a plurality of mobility devices included in the same driving group as the mobility device that includes the trailing device navigation system 300 displayed on the screen of the mobility device that includes the trailing device navigation system 300. In this case, the group driving system 100 may determine the mobility device corresponding to the user's selection input as the leading device of the driving group.

The trailing device navigation system 300 according to another embodiment of the present disclosure may receive first route information from the group driving system 100. As described in more detail below, in an embodiment, the first route information may be route information of the leading mobility device of the driving group in which the mobility device the includes the trailing device navigation system 300 is included.

Hereinafter, to facilitate understanding of some embodiments of the present disclosure, the mobility device that includes the trailing device navigation system 300 is referred to as a "trailing device", and the mobility device that includes the leading device navigation system 200 is referred to as a "leading device."

The trailing device navigation system 300 according to another embodiment of the present disclosure may transmit route information of the trailing device navigation system 300 to the group driving system 100 in real time. As described in more detail below, in an embodiment, the group driving system 100 may change the route set in the trailing device navigation system 300 or the leading device navigation system 200 of the driving group of the trailing device in response to determining that the route information of the trailing device navigation system 300 has changed from the first route to the second route.

The leading device navigation system 200 according to an embodiment of the present disclosure may receive user input for a plurality of mobility devices displayed on the screen of the leading device navigation system 200. The leading device navigation system 200 may transmit the user input to the group driving system 100. The group driving system 100 may group the leading device and the specific mobility device(s) input by the user into the same driving group.

The leading device navigation system 200 according to an embodiment of the present disclosure may transmit route information of the leading device navigation system 200 to the group driving system 100 in real time. As described in more detail below, in an embodiment, the group driving system 100 may change the route set in the leading device navigation system 200 or the trailing device navigation system 300 of the driving group of the leading device in response to determining that the route information of the leading device navigation system 200 has changed from the first route to the second route.

The group driving system 100 according to an embodiment of the present disclosure may determine a plurality of mobility devices included in a first group for group driving. The plurality of mobility devices included in the first group may be determined based on user input.

As described in more detail below, according to another embodiment, the group driving system 100 may determine a plurality of mobility devices that have driven the same route greater than or equal to a reference distance while the same destination is set in the navigation systems of the mobility devices as the mobility devices included in the first group.

The group driving system 100 according to an embodiment of the present disclosure may receive a user input from a navigation system of a mobility device included in the first driving group and determine the leading device of the first driving group.

As described in more detail below, the group driving system 100 according to another embodiment of the present disclosure may determine, among the mobility devices included in the first driving group, the mobility device whose current location is closest to the destination of the first driving group as the leading device.

As described in more detail below, the group driving system 100 according to an embodiment of the present disclosure may transmit, to the trailing device navigation system 300, information about a second route that may lead the trailing device to rejoin the first route when the trailing device of the first driving group deviates from the first route, which is the driving route of the leading device.

It is noted that although components included in an example environment in which the group driving system 100 may be utilized and operations that the components may perform are described above with reference to FIG. 1, the embodiments described above should be understood in all respects as illustrative and not restrictive.

Hereinafter, a group driving method according to an embodiment of the present disclosure is described with reference to FIGS. 2-9. The steps or operations described in connection with the following flowcharts may be understood as being performed by the group driving system 100 described with reference to FIG. 1 unless otherwise specified.

In a step or operation S100, the group driving system 100 may determine mobility devices included in a first group. The first group may be a driving group including a plurality of mobility devices driving to a first destination.

In some embodiments, the group driving system 100 may determine a plurality of mobility devices that have driven the same route greater than or equal to a reference distance while the same destination is set in the navigation systems of the mobility devices as mobility devices included in the first driving group.

Figure 3:
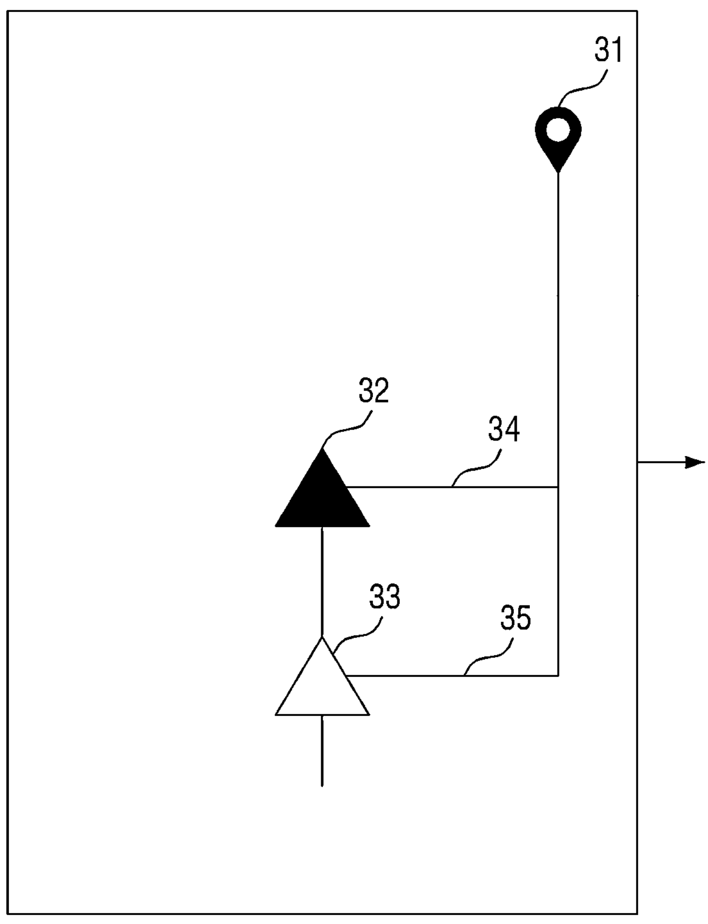
FIG. 3 is a diagram illustrating a step of determining a mobility device included in a first group, according to embodiments of the present disclosure.

For example, referring to FIG. 3, the group driving system 100 may group, into a first driving group, a first mobility device 32 and a second mobility device 33 that have driven together on a first route 34, among the first route 34 and a second route 35 to reach a first destination 31, within a reference distance for a time equal to or greater than a reference time.

In some embodiments, in the step or operation S100, the group driving system 100 may group the first mobility device 32 and the second mobility device 33 into the first driving group according to a determination that a difference in departure times for the first destination 31 of the first mobility device 32 and the second mobility device 33 driving the first route 34, among the first route 34 and the second route 35 to reach the first destination 31, is less than or equal to a reference value.

In some embodiments, in the step or operation S100, the group driving system 100 may group the first mobility device 32 and the second mobility device 33 into the first driving group according to a determination that a difference between expected times to arrive at the first destination 31 of each of the first mobility device 32 and the second mobility device 33 that drive the first route 34, among the first route 34 and the second route 35 to reach the first destination 31, is less than or equal to a reference value.

In some other embodiments, in the step or operation S100, according to the user's selection input for one or more mobility devices displayed on a navigation screen of the first mobility device, the group driving system 100 may group the first mobility device and the mobility device(s) selected by the user into a first driving group.

Figure 4:
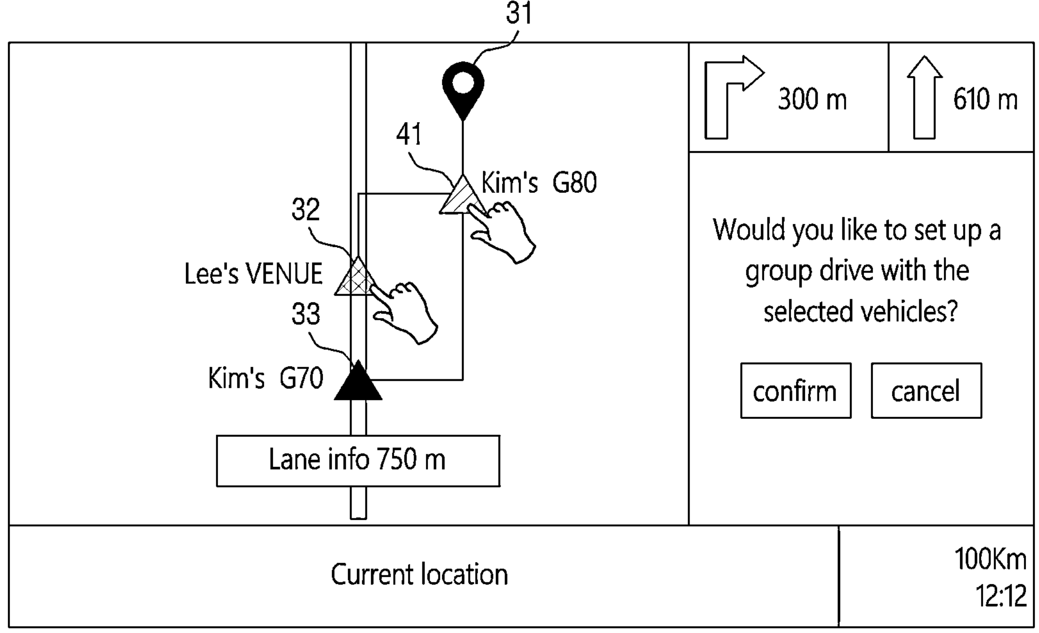
FIG. 4 is a diagram illustrating a step of determining a mobility device included in a first group, according to embodiments of the present disclosure.

For example, referring to the navigation screen of the first mobility device 33 shown in FIG. 4, the navigation system of the first mobility device 33 may display the second mobility device 32 and the third mobility device 41 with the first destination 31 set in the navigation system on the screen. The navigation system of the first mobility device 33 may transmit the selection input of the user of the first mobility device 33 for the second mobility device 32 and the third mobility device 41 to the group driving system 100.

In addition, the group driving system 100 may group the first mobility device 33, the second mobility device 32 and the third mobility device 41 into a first driving group according to the selection input of the user of the first mobility device 33 for the second mobility device 32 and the third mobility device 41.

As another example, referring to the navigation screen of the first mobility device 33 shown in FIG. 4, the navigation system of the first mobility device 33 may display the second mobility device 32 and the third mobility device 41 that exist within a reference distance of the first mobility device 33 on the screen, and may transmit the selection input of the user of the first mobility device 33 for the second mobility device 32 and the third mobility device 41 to the group driving system 100.

In addition, according to the selection input of the user of the first mobility device 33 for the second mobility device 32 and the third mobility device 41, the group driving system 100 may group the second mobility device 32 and the third mobility device 41 into a first driving group.

In some embodiments, in the step or operation S100, referring to FIG. 4, as the first mobility device 33, the second mobility device 32, and the third mobility device 41 are grouped into the first driving group, the navigation system of the first mobility device 33 may receive information about the current location of the second mobility device 32 and the route set in the navigation system of the second mobility device 32 and information about the current location of the third mobility device 41 and the route set in the navigation system of the third mobility device 41 from the group driving system 100.

Additionally, the navigation system of the first mobility device 33 may display the real-time locations of the second mobility device 32 and the third mobility device 41 on the screen according to the received information.

Referring back to FIG. 2, in a step or operation S200, the group driving system 100 may identify a leading device of the first driving group. The leading device may be input by the user, or may be selected by the group driving system 100 among the mobility devices included in the first driving group without an input by a user.

In some embodiments, in the step or operation S200, the group driving system 100 may determine, as the leading device of the first driving group, the mobility device with a closes distance between the first destination set in the navigation systems of a plurality of mobility devices included in the first driving group and the current location of the mobility device.

Figure 5:
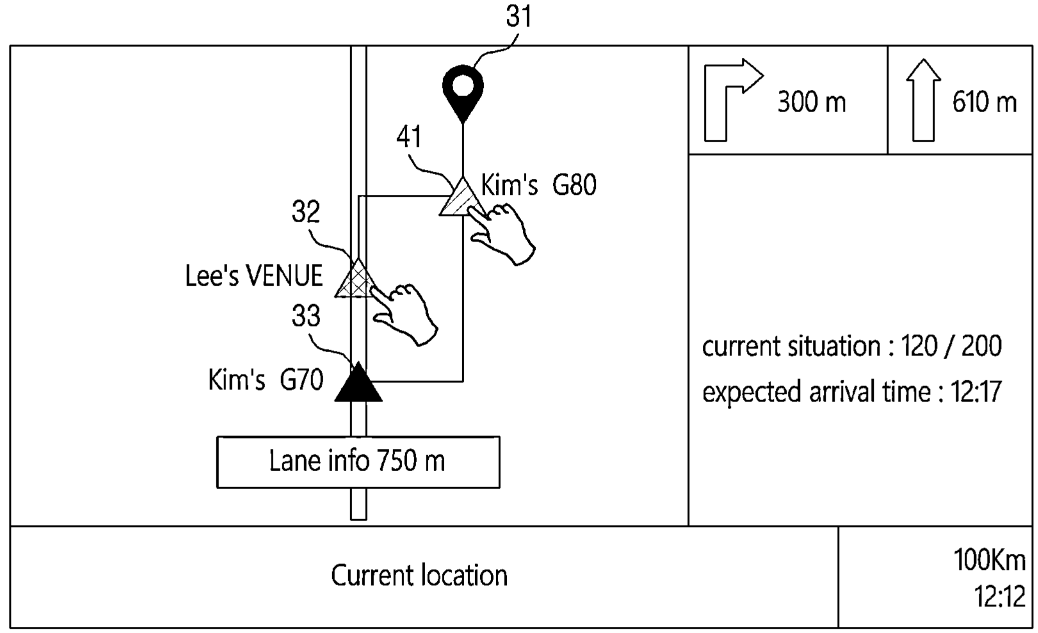
FIG. 5 is a diagram illustrating an example of a step of identifying a leading device of a first group, according to embodiments of the present disclosure.

For example, referring to FIG. 5, when the first mobility device 33, the second mobility device 32, and the third mobility device 41 are included in the first driving group, and the destination of the first driving group is the first destination 31, the group driving system 100 may determine the third mobility device 41, whose current location to the first destination 31 is closet, as the leading device of the first driving group.

In some embodiments, in the step or operation S200, the group driving system 100 may determine any one of a plurality of mobility devices included in the first driving group as the leading device of the first group according to user input.

Figure 6:
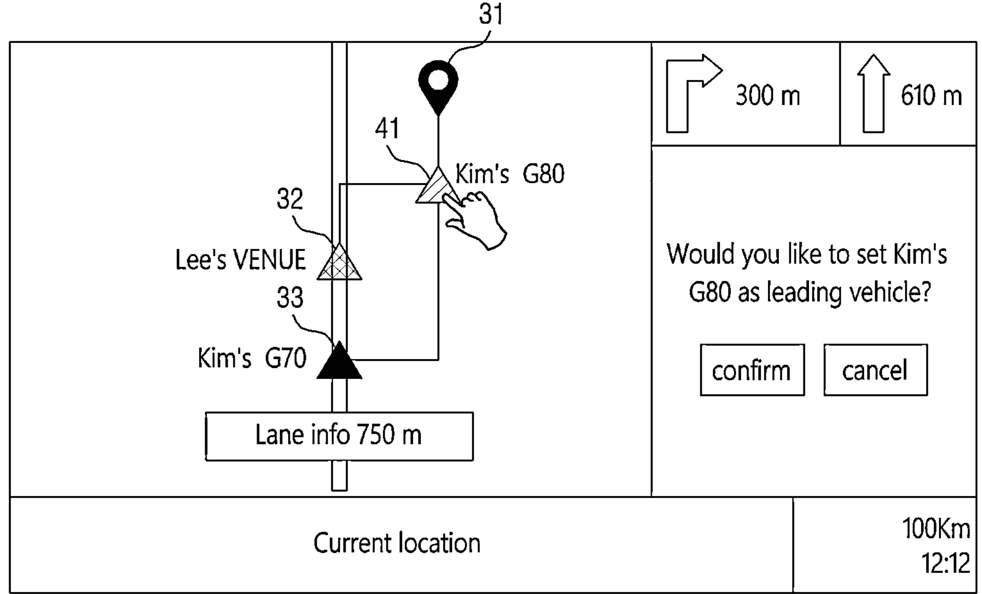
FIG. 6 is a diagram illustrating an example of a step of identifying a leading device of a first group, according to embodiments of the present disclosure.

For example, referring to the navigation screen of the first mobility device 33 shown in FIG. 6, the navigation system of the first mobility device 33 may display information about the second mobility device 32 and the third mobility device 41 included in the first driving group that includes as the first mobility device 33 on the screen.

In addition, according to the user input for the third mobility device 41 transmitted by the navigation system of the first mobility device 33, the group driving system 100 may determine the third mobility device 41 as the leading device of the first driving group.

In a step or operation S300, the group driving system 100 may transmit information about the first route currently set in the navigation system of the leading device to the navigation system of the trailing device of the first driving group.

In some embodiments, in the step or operation S200, the group driving system 100 may determine the leading device of the first driving group based on the driving history of each mobility device included in the first driving group to the first destination of the first driving group.

Figure 7:
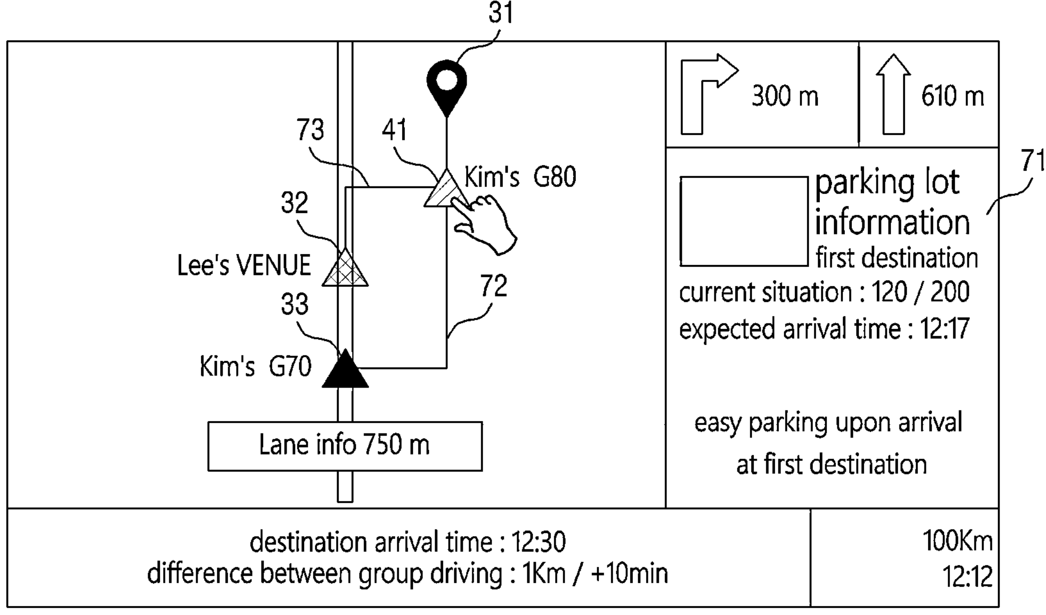
FIG. 7 is a diagram illustrating a screen that may be displayed by a navigation system of a trailing device, according to embodiments of the present disclosure.

For example, referring to the navigation screen of the first mobility device 33 shown in FIG. 7, when the route of the first driving group that includes the first mobility device 33, the second mobility device 32 and the third mobility device 41 to the first destination 31 is the first route 73, even if the third mobility device 41 has the closest distance between the first destination 31 and the mobility device, the group driving system 100 may determine the second mobility device 32 with the most driving history on the first route 73 as the leading device of the first driving group.

In some embodiments, the step or operation S200, the group driving system 100 may determine the leading device of the first driving group based on information related to the driving style of each mobility device included in the first driving group.

For example, referring to the navigation screen of the first mobility device 33 shown in FIG. 7, the group driving system 100 may determine the third mobility device 41 with the lowest speeding distance, number of sudden decelerations, and number of sudden accelerations among the driving history of the past five days as the leading device of the first driving group according to a determination that the leading device setting of the first driving group is 'safe driving priority.'

As another example, the group driving system 100 may determine the second mobility device 32 with the highest average speed during the past five days of driving as the leading device of the first driving group according to a determination that the leading device setting of the first driving group is 'early arrival priority.'

In some embodiments, in the step or operation S200, the group driving system 100 may determine a switching point for the existing leading device and the new leading device of the first driving group according to a determination that the leading device of the first driving group needs to be changed.

Figure 8:
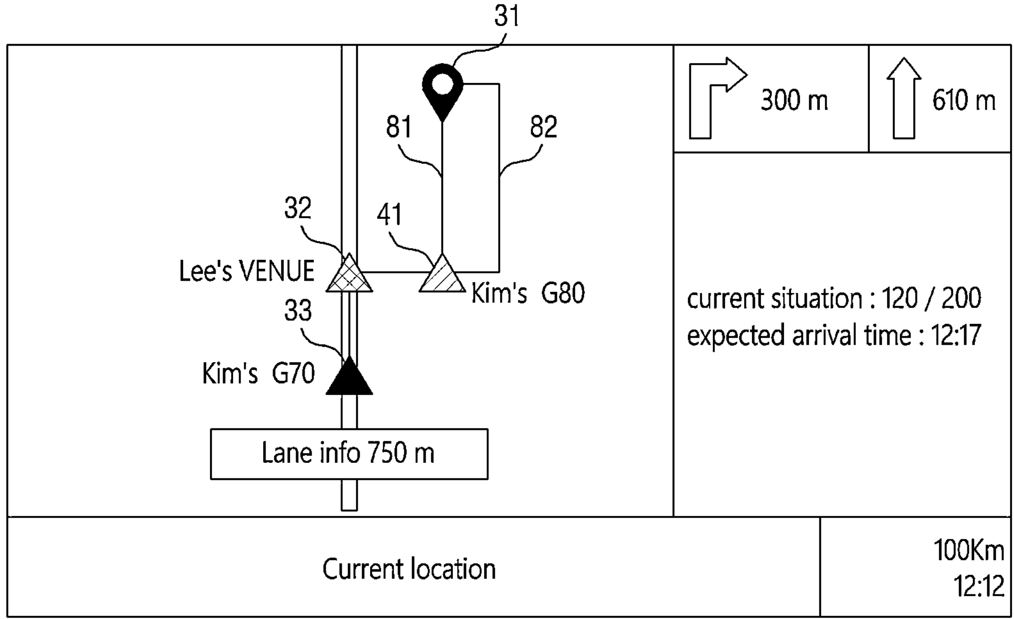
FIG. 8 is a diagram illustrating a step of setting a route of a leading device in a navigation system of a trailing device when the route of the leading device is changed, according to embodiments of the present disclosure.

For example, referring to FIG. 8, according to a determination that the user of the first mobility device 33 included in the first driving group has inputted an operation related to changing the lead vehicle of the first driving group into the navigation system of the first mobility device 33, the group driving system 100 may determine, among the plurality of mobility devices included in the first driving group, the second mobility device 32, which is the second closest in distance to the first destination 31 after the third mobility device 41 that is the existing leading device, as the new leading device.

In addition, the group driving system 100 may transmit information related to the first parking lot closest to the current location of the third mobility device 41 to the navigation system of the third mobility device 41 in order to switch the leading device so that the user of the third mobility device 41 can stop at the first parking lot. Additionally, information related to the first parking lot may be transmitted to the navigation system of the second mobility device 32 so that the user of the second mobility device 41 can stop at the first parking lot.

As another example, the group driving system 100 may transmit a notification related to switching the leading device to the second mobility device 32 in a section where an overtaking lane exists greater than or equal to a reference distance on the route of the third mobility device 41 to the first destination 31 to navigation systems of the second mobility device 32 and the third mobility device 41 in order to switch the leading device.

In some embodiments, in the step or operation S300, referring to the navigation screen of the first mobility device 33 shown in FIG. 7, when the leading device of the first driving group is determined to be the third mobility device 41, the group driving system 100 may transmit information about the first route 73 currently set in the navigation system of the third mobility device 41 to the navigation system of the second mobility device 32 and the navigation system of the first mobility device 33.

In response to the information about the first route 73 received from the group driving system 100, the navigation system of the first mobility device 33 may change the second route 72 heading to the first destination 31 set in the navigation system of the first mobility device 33 to the first route 73. Further, as shown in FIG. 7, the navigation system of the first mobility device 33 may change the expected arrival time of the area 71 where information related to the first destination 31 is displayed to the expected arrival time corresponding to the first route 73.

In addition, the navigation system of the second mobility device 32 may also respond to the information about the first route 73 received from the group driving system 100, and change the second route 72 heading to the first destination 31 set in the navigation system of the second mobility device 32 to the first route 73. Additionally, the navigation system of the second mobility device 32 may change the expected arrival time of the area where information related to the first destination 31 is displayed to the expected arrival time corresponding to the first route 73.

In some embodiments, in the step or operation S300, referring to the navigation screen of the first mobility device 33 shown in FIG. 7, the navigation system of the first mobility device 33 may display information about the distance between the third mobility device 41, which is the leading device of the first driving group, and the first mobility device 33 and the difference between the expected arrival time of the third mobility device 41 at the first destination 31 and the expected arrival time of the first mobility device 33 at the first destination 31 on the screen.

In some embodiments, in the step or operation S300, referring to the navigation screen of the first mobility device 33 shown in FIG. 7, the navigation system of the first mobility device 33 may display information about the distance between the second mobility device 32 whose current location is closest to the first mobility device 33 among the plurality of mobility devices included in the first driving group and the first mobility device 933 and the difference between the expected arrival time of the second mobility device 32 at the first destination 31 and the expected arrival time of the first mobility device 33 at the first destination 31 on the screen.

In a step or operation S400-1, the group driving system 100 may evaluate whether the route of the navigation system of the leading device has changed based on the real-time route information of the leading device received from the navigation system of the leading device of the first driving group.

In some embodiments, in the step or operation S400-1, referring to the screen of the navigation system of the first mobility device 33 shown in FIG. 8, in response to a determination that the route set in the navigation system of the third mobility device 41, which is the leading device of the first driving group, has changed from the first route 81 to the second route 82, the group driving system 100 may transmit information about the second route 82 to the second mobility device 32 and the first mobility device 33.

In a step or operation S500-1, as information about the second route 82 is received from the group driving system 100, the navigation system of the first mobility device 33 may change the first route 81 set in the navigation system of the first mobility device 33 to the second route 82.

According to this embodiment, even if the leading device among a plurality of mobility devices performing group driving suddenly changes its route, the effect of minimizing the difference between the expected arrival times for the destination of the leading device and the trailing device can be achieved.

In some embodiments, in the step or operation S500-1, referring to FIG. 8, when the information about the second route 82 is received from the group driving system 100, according to a determination that the current location of the first mobility device 33 is closer than the reference distance to the branch point of the first route 81 and the second route 82, the navigation system of the first mobility device 33, which is the trailing device of the first driving group, may display information related to the first route and the second route on the navigation screen of the first mobility device 33.

In some embodiments, in the step or operation S500-1, referring to FIG. 8, when information related to the first route 81 and the second route 82 is displayed on the navigation screen of the first mobility device 33, the user of the first mobility device 33 may input the selection for either the first route 81 or the second route 82 into the navigation system of the first mobility device 33.

In some embodiments, in the step or operation S500-1, referring to FIG. 8, according to the selection input for the first route 81 by the user of the first mobility device 33, the navigation system of the first mobility device 33 may continuously guide on the first route 81 without changing the route information set in the navigation system of the first mobility device 33 to the second route 82.

In some embodiments, in the step or operation S500-1, referring to FIG. 8, according to the selection input of the user of the first mobility device 33 for the second route 82, the navigation system of the first mobility device 33 may change the route information set in the navigation system of the first mobility device 33 to the second route 82.

In some embodiments, in the step or operation S500-1, referring to FIG. 8, when displaying information about the first route 81 and the second route 82 on the navigation screen of the first mobility device 33, according to a determination that the first mobility device 33 has driven the first route 81 by a reference distance or more, the navigation system of the first mobility device 33 may continuously guide on the first route 81 without changing the route information set in the navigation system of the first mobility device 33 to the second route 82.

In some embodiments, in the step or operation S500-1, referring to FIG. 8, when displaying information about the first route 81 and the second route 82 on the navigation screen of the first mobility device 33, according to a determination that the first mobility device 33 has driven the first route 81 by a reference distance or more, the navigation system of the mobility device 33 may change the route information set in the navigation system of the first mobility device 33 to the second route 82.

In a step or operation S400-2, the group driving system 100 may evaluate whether the route of the navigation system of the trailing device has changed based on the real-time route information of the trailing device received from the navigation system of the trailing device of the first driving group.

In a step or operation S500-2, the group driving system 100 may transmit information about an alternative route for joining the route of the leading device to the navigation system of the trailing device, according to a determination that the route set in the navigation system of the trailing device has changed.

Figure 9:
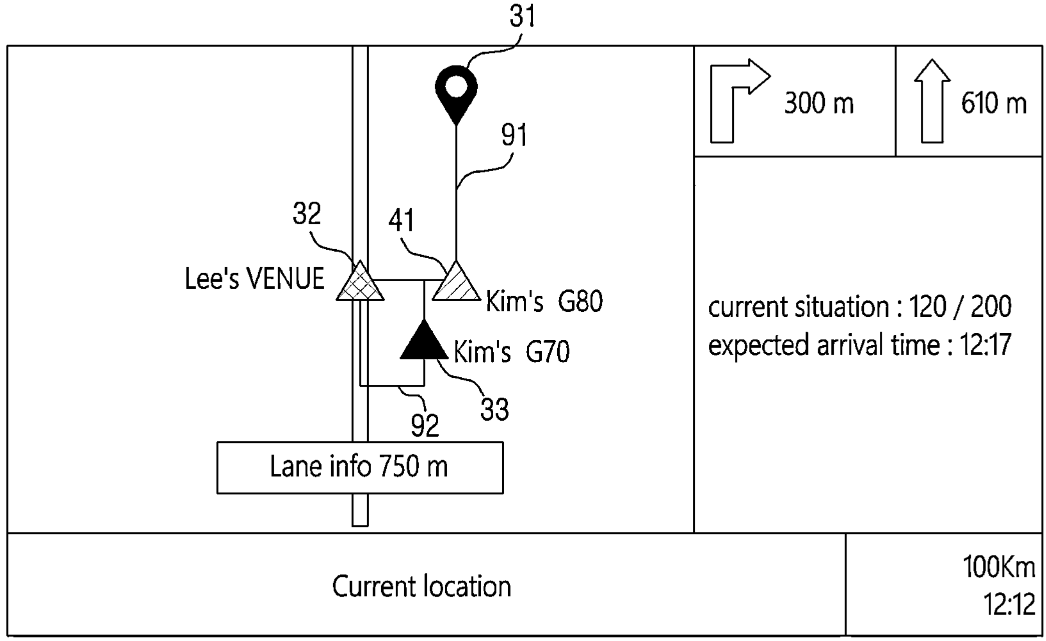
FIG. 9 is a diagram illustrating a step of setting an alternative route to join a route of a leading device in a navigation system of a trailing device, according to embodiments of the present disclosure.

In some embodiments, in the step or operation S500-2, referring to the navigation screen of the first mobility device 33 shown in FIG. 9, when the leading device of the first driving group is the third mobility device 41, according to a determination that the first mobility device 33 has deviated from the first route 91, which is the route of the third mobility device 41, the group driving system 100 may transmit, to the first mobility device 91, information about the second route 92 that can lead the first mobility device 33 to rejoin the first route 91.

According to this embodiment, the group driving system 100 can provide alternative route guidance so that the trailing device can rejoin the driving group within a relatively quick time even if the trailing device deviates from the driving group's route during group driving.

In a step or operation S500-3, the group driving system 100 may not change the route information set in the navigation system of the leading device and the trailing device if there is no change in the route of the leading device or the trailing device included in the first traveling group.

It is noted that although an example group driving method according to embodiments of the present disclosure is described in detail above, the embodiments described above should be understood in all respects as illustrative and not restrictive.

Figure 10:
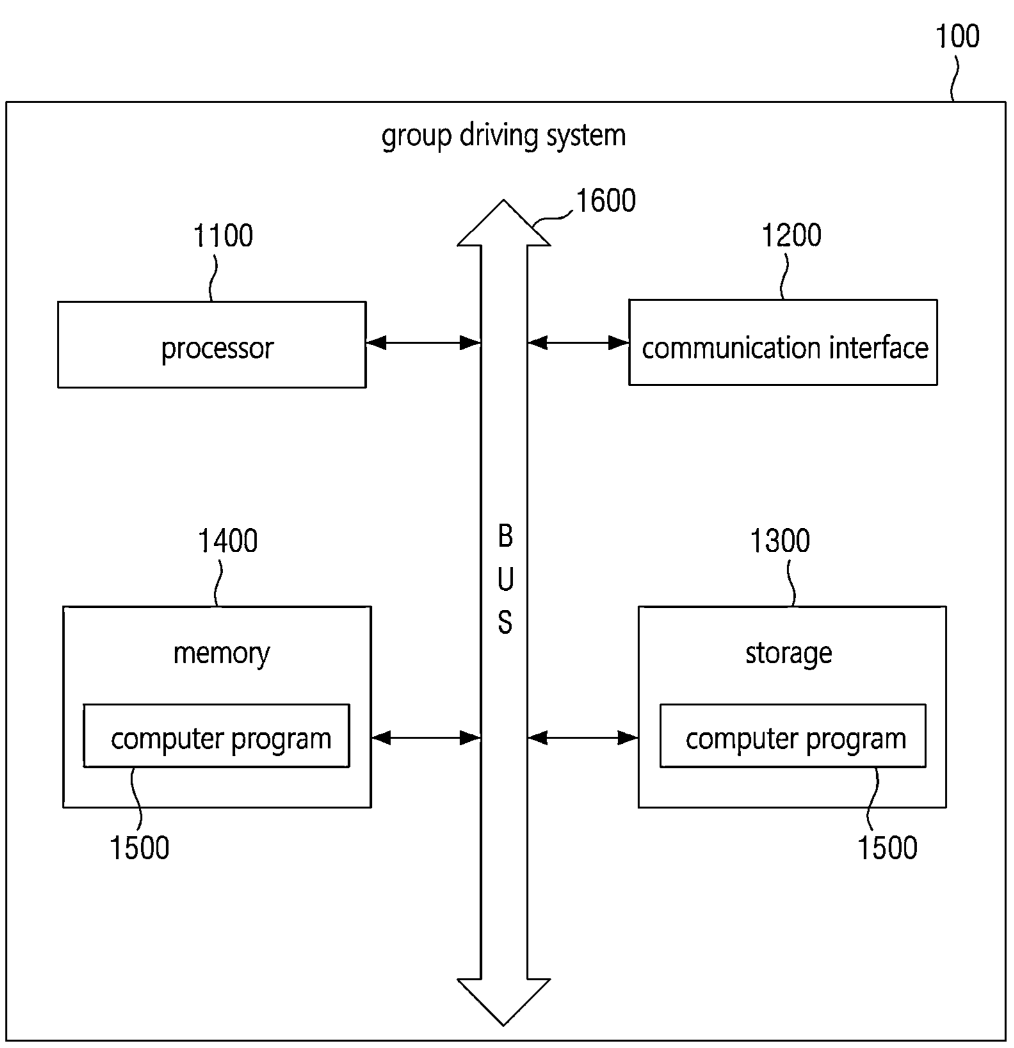
FIG. 10 is a hardware configuration diagram of a group driving system, according to an embodiment of the present disclosure.

FIG. 10 is a hardware configuration diagram of a group driving system, according to embodiments of the present disclosure. For example, the group driving system 100 of FIG. 10 may refer to the group driving system 100 described with reference to FIG. 1. The group driving system 100 may include one or more processors 1100, a system bus 1600, a communication interface 1200, a memory 1400 in which a computer program 1500 to be executed by the processor 1100 may be loaded, and a storage 1300 that stores the computer program 1500.

The processor 1100 controls the overall operation of components of the group driving system 100. The processor 1100 may perform operations of at least one application or program to execute methods/operations according to various embodiments of the present disclosure. The memory 1400 stores various data, commands and/or information. The memory 1400 may load one or more computer programs 1500 from the storage 1300 to execute methods/operations according to various embodiments of the present disclosure. The bus 1600 provides communication functions between components of the group driving system 100. The communication interface 1200 supports Internet communication of the group driving system 100. The storage 1300 may be provided in the form of a non-transitory storage medium. The storage 1300 may non-temporarily store one or more computer programs 1500. The computer program 1500 may include one or more instructions implementing methods/operations according to various embodiments of the present disclosure. When the computer program 1500 is loaded into the memory 1400, the processor 1100 may perform methods/operations according to various embodiments of the present disclosure by executing the one or more instructions.

In some embodiments of the present disclosure, the group driving system 100 described with reference to FIG. 10 may be configured by using one or more physical servers included in a server farm based on cloud technology such as a virtual machine. In this case, at least some of the processor 1100, memory 1400, and storage 1300 among the components shown in FIG. 10 may be virtual hardware, and the communication interface 1200 may also be composed of virtualized networking elements such as a virtual switch.

Various embodiments of the present disclosure and effects according to the embodiments have been described with reference to FIGS. 1-10. The effects of the technical idea of the present disclosure are not restricted to those set forth herein, and other unmentioned technical effects should be clearly understood by one of ordinary skill in the art to which the present disclosure pertains by referencing the detailed description of the present disclosure.

Although operations are shown in a specific order in the drawings, it should not be understood that desired results can be obtained only when the operations are performed in the specific order or sequential order or when all of the operations are performed. In certain situations, multitasking and parallel processing may be advantageous. According to the above-described embodiments, it should not be understood that the separation of various configurations is necessarily required. Rather, it should be understood that the described program components and systems may generally be integrated together into a single software product or be packaged into multiple software products.

Those having ordinary skill in the art should appreciate that many variations and modifications can be made to the described embodiments without substantially departing from the principles of the present disclosure. Therefore, the described embodiments of the present disclosure are used in a generic and descriptive sense only and not for purposes of limitation. The scope of protection of the present disclosure should be interpreted in accordance with the claims below, and all technical ideas within the equivalent scope should be interpreted as being included in the scope of rights of this disclosure.

What is claimed is:

1. A method performed by a computing system for driving in a group, the method comprising:

determining a plurality of mobility devices included in a first group for group driving;

identifying a leading device among the plurality of mobility devices included in the first group;

transmitting first route information set in a navigation system of the leading device to a trailing device included in the first group together with the leading device;

setting a first route based on the first route information in a navigation system of the trailing device;

transmitting second route information set in the navigation system of the leading device to the trailing device in response to the leading device deviating from the first route;

calculating a difference between i) a branch point of the first route set in the navigation system of the trailing device and a second route set in the navigation system of the leading device and ii) a current location of the trailing device;

comparing the calculated difference with a reference value; and controlling the navigation system of the trailing device based on a result of the comparison of the calculated difference with the reference value, including controlling the navigation system of the trailing device such that, based on the calculated difference being less than or equal to the reference value, information regarding the first route and the second route is simultaneously displayed in the navigation system of the trailing device, and controlling the navigation system of the trailing device such that, in accordance with a selection input by a user of the trailing device to the displayed information, a selected one of the first route and the second route is set in the navigation system of the trailing device, wherein identifying the leading device includes:

receiving a request to switch the leading device, in response to receiving the request to switch the leading device, transmitting information regarding a parking location to a navigation system of an existing leading device and a navigation system of a new leading device in the first group to guide the existing leading device and the new leading device to stop at the parking location, and changing the leading device from the existing leading device to the new leading device.

2. The method of claim 1, wherein determining the plurality of mobility devices included in the first group for group driving comprises determining the plurality of mobility devices included in the first group based on a user input.

3. The method of claim 1, wherein determining the plurality of mobility devices included in the first group for group driving comprises including, in the first group, a plurality of mobility devices that have driven a same route greater than or equal to a reference distance while a same destination is set in navigation systems of the plurality of mobility devices.

4. The method of claim 1, wherein identifying the leading device comprises determining a leading device among a plurality of mobility devices included in the first group based on a user input.

5. The method of claim 1, wherein identifying the leading device comprises determining a first mobility device located at a closest distance to a first destination set in navigation systems of the plurality of mobility devices included in the first group as the leading device of the first group.

6. The method of claim 1, wherein controlling the navigation system of the trailing device comprises:

displaying information related to the first route and the second route on a screen of the navigation system of the trailing device according to a determination that the calculated difference between the branch point of the first route and the second route and the current location of the trailing device is less than or equal to the reference value; and setting the second route in the navigation system of the trailing device according to a determination that the trailing device has driven a route corresponding to the second route greater than or equal to a reference value.

7. The method of claim 1, further comprising setting a third route for re-entering the first route set in the navigation system of the leading device in the navigation system of the trailing device according to a deviation from the first route by the trailing device.

8. A system for driving in a group, the system comprising:

one or more processors; and a memory for storing one or more instructions that, when executed by the one or more processors, cause the one or more processors to perform operations including:

determining a plurality of mobility devices included in a first group for group driving, identifying a leading device among the plurality of mobility devices included in the first group, transmitting first route information set in a navigation system of the leading device to a trailing device included in the first group together with the leading device, setting a first route based on the first route information in a navigation system of the trailing device, transmitting second route information set in the navigation system of the leading device to the trailing device in response to the leading device deviating from the first route, and calculating a difference between i) a branch point of the first route set in the navigation system of the trailing device and a second route set in the navigation system of the leading device and ii) a current location of the trailing device, comparing the calculated difference with a reference value, and controlling the navigation system of the trailing device based on a result of the comparison of the calculated difference with the reference value, including controlling the navigation system of the trailing device such that, based on the calculated difference being less than or equal to the reference value, information regarding the first route and the second route is simultaneously displayed in the navigation system of the trailing device, and controlling the navigation system of the trailing device such that, in accordance with a selection input by a user of the trailing device to the displayed information, a selected one of the first route and the second route is set in the navigation system of the trailing device, wherein identifying the leading device includes:

receiving a request to switch the leading device, in response to receiving the request to switch the leading device, transmitting information regarding a parking location to a navigation system of an existing leading device and a navigation system of a new leading device in the first group to guide the existing leading device and the new leading device to stop at the parking location, and changing the leading device from the existing leading device to the new leading device.

9. The system of claim 8, wherein determining the plurality of mobility devices included in the first group for group driving comprises determining the plurality of mobility devices included in the first group based on a user input.

10. The system of claim 8, wherein determining the plurality of mobility devices included in the first group for group driving comprises including, in the first group, a plurality of mobility devices that have driven a same route greater than or equal to a reference distance while a same destination is set in navigation systems of the plurality of mobility devices.

11. The system of claim 8, wherein identifying the leading device comprises determining a leading device among a plurality of mobility devices included in the first group based on a user input.

12. The system of claim 8, wherein identifying the leading device comprises determining a first mobility device located at a closest distance to a first destination set in navigation systems of the plurality of mobility devices included in the first group as a leading device of the first group.

13. The system of claim 8, wherein controlling the navigation system of the trailing device comprises:

displaying information related to the first route and the second route on a screen of the navigation system of the trailing device according to a determination that the calculated difference between the branch point of the first route and the second route and the current location of the trailing device is less than or equal to the reference value; and setting the second route in the navigation system of the trailing device according to a determination that the trailing device has driven a route corresponding to the second route greater than or equal to a reference value.

14. The system of claim 8, wherein the operations further include setting a third route for re-entering the first route set in the navigation system of the leading device in the navigation system of the trailing device according to a deviation from the first route by the trailing device.

15. A non-transitory computer-readable storage medium having a group driving program stored thereon, wherein the group driving program, when executed by one or more processors, causes the one or more processors to:

determine a plurality of mobility devices included in a first group for group driving;

identify a leading device among the plurality of mobility devices included in the first group;

transmit first route information set in a navigation system of the leading device to a trailing device included in the first group together with the leading device;

set a first route based on the first route information in a navigation system of the trailing device;

transmit second route information set in the navigation system of the leading device to the trailing device in response to the leading device deviating from the first route;

calculate a difference between i) a branch point of the first route set in the navigation system of the trailing device and a second route set in the navigation system of the leading device and ii) a current location of the trailing device;

compare the calculated difference with a reference value; and control the navigation system of the trailing device based on a result of the comparison of the calculated difference with the reference value, including controlling the navigation system of the trailing device such that, based on the calculated difference being less than or equal to the reference value, information regarding the first route and the second route is simultaneously displayed in the navigation system of the trailing device, and controlling the navigation system of the trailing device such that, in accordance with a selection input by a user of the trailing device to the displayed information, a selected one of the first route and the second route is set in the navigation system of the trailing device, wherein identifying the leading device includes:

receiving a request to switch the leading device;

in response to receiving the request to switch the leading device, transmitting information regarding a parking location to a navigation system of an existing leading device and a navigation system of a new leading device in the first group to guide the existing leading device and the new leading device to stop at the parking location; and changing the leading device from the existing leading device to the new leading device.

* * * * *